United States Patent
Krishnakumar et al.

(10) Patent No.: US 8,694,520 B1
(45) Date of Patent: Apr. 8, 2014

(54) METHOD AND APPARATUS FOR PROVIDING VIRTUAL CONTENT TO A MOBILE DEVICE

(75) Inventors: Anita Krishnakumar, Santa Clara, CA (US); Vinod Ramachandran, Sunnyvale, CA (US); Vinod Krishnan, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 13/096,746

(22) Filed: Apr. 28, 2011

(51) Int. Cl.
G06F 17/30 (2006.01)

(52) U.S. Cl.
USPC .......................................... 707/758; 707/793

(58) Field of Classification Search
None
See application file for complete search history.

(56) References Cited

U.S. PATENT DOCUMENTS

| | | |
|---|---|---|
| 2007/0156519 A1 | 7/2007 | Agassi et al. |
| 2008/0010112 A1 | 1/2008 | Kniaz et al. |
| 2008/0108308 A1* | 5/2008 | Ullah ........................... 455/41.2 |
| 2009/0199107 A1 | 8/2009 | Lewis et al. |
| 2009/0319355 A1* | 12/2009 | Sinyagin et al. ........... 705/14.25 |
| 2010/0037204 A1 | 2/2010 | Lin et al. |
| 2010/0190481 A1 | 7/2010 | Nath et al. |
| 2011/0055005 A1 | 3/2011 | Lang |
| 2011/0117529 A1* | 5/2011 | Barash et al. ................. 434/265 |

* cited by examiner

Primary Examiner — Syed Hasan
(74) Attorney, Agent, or Firm — Birch, Stewart, Kolasch & Birch, LLP (57) ABSTRACT

A virtual content server and method are provided for giving virtual content providers an opportunity to provide their virtual content, such as an advertisement, to a mobile device of a user who has achieved or otherwise satisfied one or more predetermined conditions in, or interacted in a certain way with, one or more mobile apps on the mobile device. When a certain condition is satisfied in a mobile app of the mobile device, a device identifier of the mobile device is sent to the virtual content server and stored in a previously-generated recipient list of users in a recipient list database. When a virtual content request including the device identifier is later received from the mobile device, the virtual content server retrieves as at least part of a plurality of virtual content candidates virtual content previously associated with recipient list(s) for which the device identifier has been stored in the recipient list database. Then, one or more of the virtual content candidates are selected and sent to the mobile device to be displayed.

21 Claims, 8 Drawing Sheets

Recipient list database     800a
(device IDs)

| Recipient list ID 1 | Recipient list ID 2 | Recipient list ID 3 | ... | Recipient list ID X |
|---|---|---|---|---|
| Device ID 1 | Device ID 3 | Device ID 1 | | Device ID Y |
| Device ID 2 | Device ID 4 | Device ID 4 | | Device ID Z |
| | | Device ID 5 | | ... |
| | | | | |

Columns: 800-1, 800-2, 800-3

FIG. 8B

Recipient list database     800b
(associated info)

| Recipient list | Device ID(s) | Account ID | Recipient list associated content (RLAC) | Expiration data (optional) | Keyword(s) (optional) |
|---|---|---|---|---|---|
| Recipient list ID 1 | (see, e.g., FIG. 8A) | Account ID X | RLAC 1 | Exp data 1 | Keyword list 1 |
| Recipient list ID 2 | | Account ID X | RLAC 2 | Exp data 2 | Keyword list 2 |
| Recipient list ID 3 | | Account ID Y | ... | ... | ... |
| ... | | | | | |

Columns: 810, 820, 830, 840

METHOD AND APPARATUS FOR PROVIDING VIRTUAL CONTENT TO A MOBILE DEVICE

TECHNICAL FIELD

The technical field relates to apparatuses and methods for providing virtual content to mobile devices and other computing devices based on information associated with the device itself, applications, and browsers stored on the device, and/or users of the device.

BACKGROUND

The popularity of mobile devices such as cellular phones and portable computing devices continues to increase as more users rely on mobile devices to gain access to virtual content delivered to the users via a network such as a cellular network or the Internet. As such, virtual content providers are competing with each other to attract more users to their virtual content. For example, "on-line" advertisers are constantly looking for ways to expand the reach of their advertisements to as many mobile devices as possible and thereby increase sales via increased responses to their advertisement content by users.

BRIEF SUMMARY OF THE INVENTION

A concept of the invention is to provide technical solutions granting virtual content providers an opportunity to provide their virtual content, such as an advertisement, to a mobile device of a user who has interacted in a certain way with one or more mobile apps on the mobile device. A virtual content provider may wish to log users who have triggered a particular event or satisfied one or more predetermined event conditions in the mobile app. The logged users may then be provided with further virtual content related in some manner to the event, mobile app, or virtual content provider. In an exemplary embodiment, a virtual content provider may, e.g., "remarket" their mobile app or related products with virtual content consisting of a remarketing advertisement.

More generally, implementations of the inventive concepts may include a computer-implemented method for providing virtual content, comprising: generating a code snippet associated with a recipient list ID; receiving an add recipient request to store a device ID of a device in association with the recipient list ID, said add recipient request being in response to the execution of the code snippet compiled into an application on the device; storing the device ID in association with the recipient list ID, wherein the recipient list ID is associated with one or more virtual content as recipient list associated content; receiving a virtual content request from the device, the virtual content request including the device ID; determining the recipient list ID associated with the received device ID; retrieving, as at least part of a plurality virtual content candidates, recipient list associated content associated with the determined recipient list ID; and selecting one or more of the recipient list associated content as a candidate to send to the device in response to the virtual content request.

According to other aspects, the method of the invention may further comprise generating the recipient list ID of the recipient list in response to a recipient list creation request received from a front end interface; generating the code snippet in response to the recipient list creation request; and sending the code snippet to the front end interface. In some embodiments, the code snippet is operable to cause the device to send the add recipient request when executed as compiled in a first application on the device. In other embodiments, the recipient list associated content is virtual content uploaded and associated with the recipient list based on input from a front end interface.

According to other aspects, the method of the invention may further comprise generating the add recipient request in response to input from a first application on the device, and receiving the virtual content request from a second application on the device. In some embodiments, the first application and the second application are the same application. In other embodiments, the first application and the second application are different applications. According to some embodiments, the first application is a free version and the virtual content associated with the recipient list ID advertises a paid version of the first application. In other embodiments, the recipient list associated content advertises in-app purchases to be made within the first application or downloadable content for the first application.

According to other aspects, the method of the invention may further comprise determining a plurality of recipient list IDs stored in the recipient list database that are each associated with the received device ID, in response to the virtual content request; and retrieving, as at least part of the plurality of virtual content candidates, recipient list associated content associated with the plurality of determined recipient list IDs.

According to other aspects, the method of the invention may further comprise generating the recipient list based on recipient list information received from a front end interface, the recipient list information including one or more of a virtual content provider ID, expiration data, label data for describing the recipient list, and association data indicating virtual content to be associated with the recipient list as the recipient list associated content. In some embodiments, the virtual content server deletes device IDs from a recipient list in the recipient list database based on whether a particular device ID has been stored in the recipient list longer than a threshold indicated by expiration data associated with the recipient list.

According to other aspects, the method of the invention may further comprise anonymizing the device ID of the device, wherein the device ID uniquely identifies the device. In some embodiments, the device is a mobile device. In some embodiments, the virtual content server comprises a distributed computing system.

According to other aspects, the method of the invention may further comprise sending the selected one or more virtual content candidates to the device.

According to other aspects, the method of the invention may further comprise selecting the selected virtual content based on one or more of factors including which of the virtual content candidates have been previously presented more often and auction bids associated with the virtual content candidates. In some embodiments, the recipient list addition request further includes a virtual content provider ID identifying the virtual content provider associated with the recipient list ID.

Further implementations of the inventive concepts may include a computer-implemented method, comprising generating a recipient list creation request to create a recipient list in a virtual content server in response to input at a front end interface; sending the recipient list creation request to the virtual content server; receiving a code snippet associated with a recipient list ID, said code snippet being generated by the virtual content server in response to the recipient list creation request; compiling the code snippet into one or more executable locations within an application; and distributing the application to one or more devices, wherein when executed as part of the application on the device the code snippet is operable to cause the device to send an add recipient request to store a device ID of the device in association with the recipient list ID in the virtual content server.

Still further implementations of the inventive concepts may include a method for providing virtual content to a mobile device, comprising running a first mobile application on the mobile device executing a code snippet compiled in the first mobile application when a particular event condition is satisfied through interaction with the first mobile application, wherein said code snippet causes the mobile device to perform the steps of retrieving a recipient list ID previously associated with the code snippet and a device ID of the mobile device; sending and add recipient request including the device ID and the recipient list ID to a virtual content server such that the device ID is stored in association with the recipient list ID in a recipient list database of the virtual content server, wherein the method further comprises: generating a virtual content request including the device ID based on operation of a second mobile application on the mobile device; sending the virtual content request to the virtual content server; receiving one or more virtual content from the virtual content server, wherein the received virtual content is selected from one or more virtual content candidates including virtual content previously associated with one or more recipient list IDs associated with the device ID included in the virtual content request; and displaying the one or more virtual content in the second mobile application.

In some embodiments, the first mobile application and the second mobile application are the same application. In other embodiments, the first mobile application and the second mobile application are different applications. In some embodiments, the first mobile application is a free version and the virtual content associated with the recipient list ID advertises a paid version of the first mobile application. In other embodiments, the virtual content associated with the recipient list ID advertises in-app purchases to be made within the first application or downloadable content for the first application. In some embodiments, said code snippet causes the mobile device to further send a virtual content provider ID identifying the virtual content provider associated with the code snippet to the virtual content server.

Additional implementations of the inventive concepts may include a virtual content serving system, comprising generating means for generating a code snippet associated with a recipient list ID; receiving means for receiving an add recipient request including a device ID of a device and the recipient list ID, the add recipient request being in response to the execution of the code snippet as compiled into an application on the device; a storage unit storing the device ID in association with the recipient list ID, wherein the recipient list ID is associated with one or more virtual content as recipient list associated content; receiving means for receiving a virtual content request from the device, the virtual content request including the device ID; determining means for determining the recipient list ID associated with the received device ID; retrieving means for retrieving, as at least part of a plurality virtual content candidates, recipient list associated content associated with the determined recipient list ID; and selecting means for selecting the recipient list associated content as a candidate to send to the device in response to the virtual content request.

According to some aspects, when executed as part of a first mobile application on the device, the code snippet is operable to cause the device to send the add recipient request to the virtual content server.

According to some aspects, the virtual content server of the invention may further comprise an input unit receiving an instruction to generate the recipient list in response to a recipient list creation request received from a front end interface. According to some aspects, the virtual content server of the invention may further comprise an output unit outputting the selected recipient list associated content to the device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become readily apparent from this detailed description to those skilled in the art.

BRIEF DESCRIPTION OF THE SEVERAL VIEWS OF THE DRAWINGS

The present invention will become more fully understood from the detailed description given herein below and the accompanying drawings, which are given by way of illustration only and thus are not limitative of the present invention, and wherein:

FIG. 8A shows an example in which one or more recipient list IDs (800-1, 800-2, etc.) are stored for recipient lists in the recipient list database 800a.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
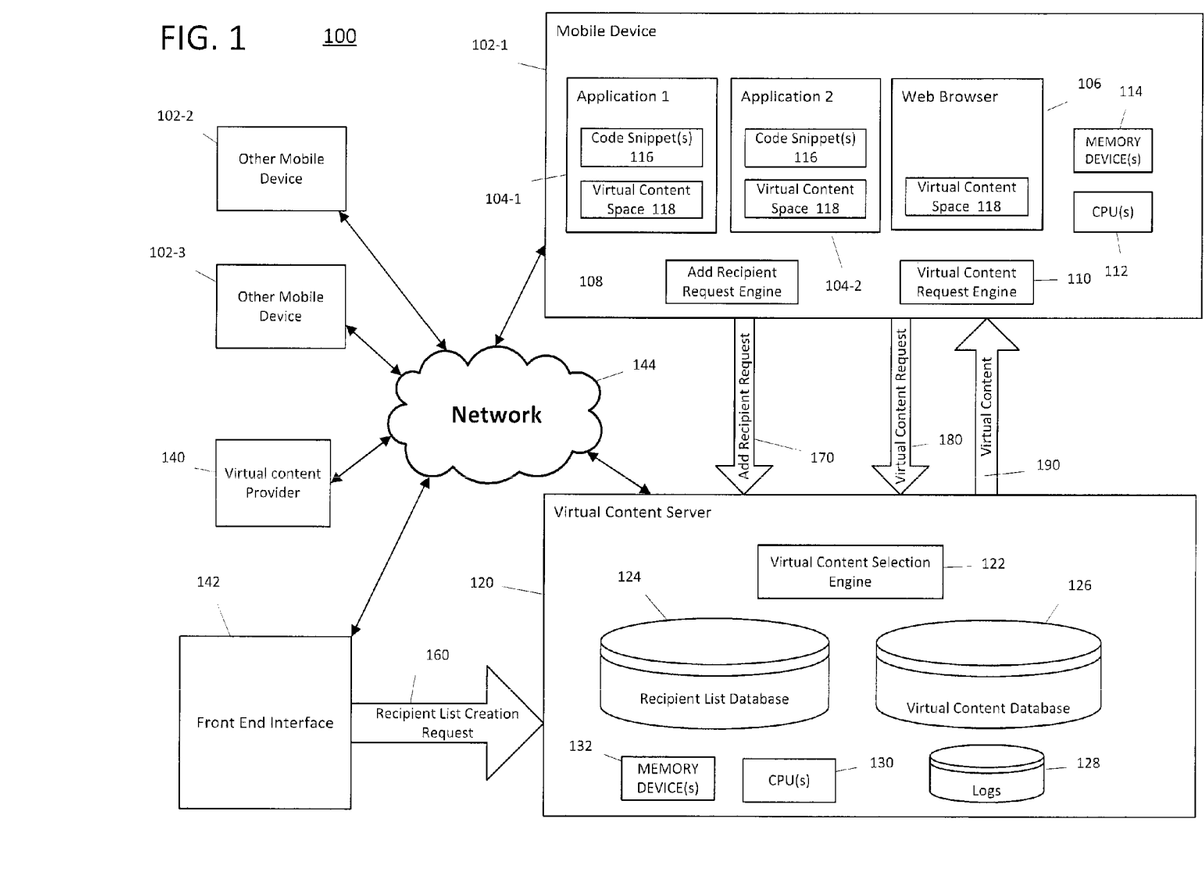
FIG. 1 shows a block diagram illustrating an overall system 100 in which a mobile device 102 transmits a virtual content request 180 to, and receives virtual content 190 from, a virtual content server 120 via a network 144.

FIG. 1 shows a block diagram illustrating an overall system 100 in which a mobile device 102 transmits a virtual content request 180 to, and receives virtual content 190 from, a virtual content server 120 via a network 144.

Network 144 may be the Internet, a cellular network, a wired network, a wireless network, a cloud computing network, or other conventional network technology as generally recognized in the art. It is to be understood that, in practice, there will be plural and likely a very large number of mobile devices (102-1, 102-2, etc.) connected to the network 144. Also, the virtual content server 120 may be a unitary device but would preferably be implemented as a server farm or a distributed computing system in order to handle large capacities of virtual content stored in virtual content database 126 and the many simultaneous connections with mobile devices 102.

The mobile devices 102 may include conventional components such as one or more mobile applications 104 (two different mobile apps 104-1 and 104-2 are shown), a browser 106, one or more memory devices 114, and one or more processors (CPUs) 112. Examples of mobile devices 102 include such known devices as smart phones, tablets, etc., but it is to be understood that the device 102 need not be a mobile device and that the inventive concepts apply to other computing devices such as a desktop PC.

Conventional components such as displays, speakers, microphones, connectors, and input devices may also be included in the mobile device 102 as is well known.

Aspects of the invention include a recipient list addition request engine 108 and a virtual content request engine 110 as part of a conventional device such as a smart phone, tablet, or desktop PC. The add recipient request engine 108 and the virtual content request engine 110 may be implemented separately or together as a part of an application or a browser, or may be independent as illustrated.

It is to be understood that the CPUs and memory devices (e.g., the CPU 112 and memory 114 for the mobile device 102 and/or the CPU 130 and memory 132 for the virtual content server 120) may be arranged as dedicated units each programmed with the functionalities described herein for the various functional units, such as the virtual content request engine 122 and the add recipient request engine 108, described in more detail later, or may be hardware resources that are shared among multiple functional units. The hardware design choice for such arrangements is governed by routine engineering principles such as size, weight, cost, etc., based on components available at the time of implementation. Moreover, the inventive techniques and aspects described herein, although shown in block diagram form, may be implemented using a combination of hardware, firmware, and/or software as is known in the art.

The virtual content server 120 may include a virtual content selection engine 122, a recipient list database 124, a virtual content database 126, a log database 128, one or more processors (CPUs) 130, and one or more memory devices 132. The virtual content selection engine 122, the recipient list database 124, the virtual content database 126, and the log database 128 may be part of the virtual content server 120 as illustrated, or provided as independent components in communication with the virtual content server 120 in a manner known in the art. For example, virtual content server 120 may be provided as a distributed computing system. The recipient list database stores "recipient lists," which are lists of users or devices of users, as will be described in more detail later. The virtual content database 126 may include any type of virtual content, including, e.g., advertisement content, that is received from one or more virtual content providers 140 via network 144. The virtual content selection engine 122 may be implemented as part of a conventional virtual content serving system, such as AdSense (Google Display) and/or Google Search Ad serving systems.

In other words, virtual content selection engine 122 and virtual content database 126 may be a conventional ad (or virtual content) serving system that provides ad candidates in response to an ad content request. Such conventional ad serving systems may use contextual matching (e.g., based on current and/or past search queries, context of publishing page, history, etc.) or other algorithms to determine virtual content candidates within the available content that may be served in response to the virtual content request 180. Any and all such conventional or future developed ad or virtual content serving systems and methods are within the scope of this section.

Moreover, the virtual content selection engine 122 may apply conventional virtual content (ad) selection and/or auction-based algorithms to determine, from among the candidates, which ad(s) to serve up as an impression to a requesting device such as mobile device 102. For example, the recipient list associated content, e.g., a remarketed ad or other sponsored content, may enter the auction process as any other ad along with an auction bid. Because a selection algorithm may try to serve ads based on multiple criteria including which ads have been clicked more often before, the recipient list associated content may succeed more often because it is likely to be more relevant to users and, therefore, more likely to be clicked more often. Note that the combination of auction bid and user relevance (ascertained from past clicks, for example) may be used to determine which ad is served according to the auction.

A concept of the invention is to provide technical solutions granting virtual content providers an opportunity to provide their virtual content, such as an advertisement, to a mobile device of a user who has interacted in a certain way with one or more mobile apps on the mobile device. A virtual content provider may wish to log users who have triggered a particular event or satisfied one or more predetermined event conditions in the mobile app 104. The logged users may then be provided with further virtual content related in some manner to the event or mobile app, such that the provider may, e.g., "remarket" their mobile app or related products with virtual content consisting of a remarketing advertisement.

By way of example, the developer of a mobile application such as the game Angry Birds may wish to advertise their products to users of Angry Birds who have achieved a particular event within the game. When a user completes Level 5 of the trial version of the game, this may indicate that the user enjoys playing Angry Birds and therefore may react favorably to an advertisement offering the full version of the game for sale. Accordingly, the developer of Angry Birds would find it desirable to present such a remarketing advertisement for the full, paid version of Angry Birds (or other applications of the developer or its affiliates) to the user of the device who achieved the in-game event, accessed a particular application page, or otherwise satisfied one or more event conditions.

It is to be understood that an event in the context of this application is not necessarily limited to a singular achievement of the user but may be related to satisfying multiple conditions such as using the mobile application in a particular manner and/or for a particular amount of time.

For example, an app that has a feature like "zoom" could have a zoom-related in-app purchase or download that expands the zoom functionality, which the developer might wish to market to the user once they use zoom a particular number of times. Other events which could trigger code snippet execution may include, but are not limited to, events such as: loading a new page (e.g., finishing level 5 of the game); the user touching a particular portion of a touch screen; scrolling down to a particular section of a page; the user using the keyboard when viewing a particular page; the existing window losing focus (e.g., user opening or otherwise making another app active); the window gaining focus (e.g., user returning to the app); switching, swiping, or otherwise changing from one page to another; and prior to loading virtual content on sound (e.g., music) application. Further events as may be supported by the capabilities of the mobile device platform and as generally understood by one of ordinary skill in the art are included in the scope of potential events according to aspects of the present invention.

In conventional content remarketing systems based on a desktop environment, a content publisher may have added JavaScript code to a web page that is intended to be accessed by a user. When the user lands on the page or otherwise interacts with the page using a web browser, information identifying the particular browser (such as a browser cookie) may be retrieved and stored for remarketing purposes. However, since this JavaScript code is merely a part of the HTML code for the web page the system is not capable of capturing more detailed events and/or actions that are performed or satisfied by the user and therefore has limited remarketing functionality.

On the other hand, the present invention provides developers (content providers) with the ability to recompile one or more executable code snippets into trigger points within an application (e.g., a mobile application on a mobile device). These trigger points may be included within the application code to be executable according to whether any number of possible preconditions have been satisfied, as defined by the logic in the application code. As may be readily appreciated by one of ordinary skill in the art, these preconditions or events may be defined according to any of the inputs available to the application, whether from components of the device hardware (such as, e.g., location signals from a GPS unit, accelerometer, light sensor, etc.) or information otherwise retrievable by the application. Additionally, a device may be identified by a unique identifier such as, e.g., the device ID of a mobile device, as discussed in more detail below.

Owing to these features of the present invention, a broader range of triggerable events, conditions, user actions, etc., may be defined by a developer. Accordingly, content remarketers can define the triggering events with greater robustness such that users may be more advantageously presented with remarketing content. Other advantageous features of the invention will become apparent to one of ordinary skill in the art from the description below.

According to aspects of the invention, in order to determine when a particular event has occurred in a mobile application, a mobile app 104 of mobile device 102 may include one or more code snippet(s) 116 of code compiled therein. According to aspects of the invention, when code snippet 116 is executed within the application, the mobile device 102 is made to send an add recipient request 170 to virtual content server 120, in a process described later in more detail with respect to FIG. 2. Add recipient request 170 may be a request to store (or "add") the device ID of the mobile device 102 as part of a "recipient list" of devices on which users have triggered the code snippet 116 during use of mobile app 104 on the mobile device 102. The device ID may be either a raw device ID or an anonymized (e.g., hashed) device ID, as discussed in more detail later. The anonymizing function may be executed as part of the execution of the code snippet.

According to further aspects of the invention, the code snippet 116 compiled in mobile app 104 has been previously associated with a particular recipient list by the application developer (virtual content provider) in a process described in more detail later with respect to FIG. 2.

According to aspects of the invention, because the application developer (virtual content provider) wishes to reach those users who have achieved a particular event condition using their mobile app 104, code snippet 116 is preferably compiled into the mobile app 104 such that the code snippet 116 is executed when the particular event condition is satisfied through user operation of the mobile app 104. This process is described in more detail later with respect to FIG. 3.

According to other aspects of the invention, when the code snippet 116 is executed a device ID of the mobile device, a recipient list ID associated with the executed code snippet, and, optionally, a virtual content provider account ID, may be included in a add recipient request 170, which is sent to the virtual content server 120 from the mobile device 102. Then, the virtual content server 120 stores the device ID in recipient list database 124 in association with the recipient list ID of the virtual content provider associated with the virtual content provider ID. This process is described in more detail later with respect to FIG. 4.

According to further aspects of the invention, one or more of mobile apps 104 and browser 106 may include a virtual content space 118 for displaying received virtual content 190. For example, mobile app 104-2 may be an application of a virtual content publisher. By way of further example, browser 106 may be directed to display a website of a virtual content publisher, where the website includes a virtual content space 118. Alternatively, browser 106 may include a virtual content space 118 as part of the browser application itself.

According to aspects of the invention, an application (or browser) with a virtual content space 118 sends a virtual content request 180 to the virtual content server 120. The virtual content server 120 then retrieves and/or selects virtual content 190 to send to the mobile device 102 to display in virtual content space 118, based at least in part on the device ID of the mobile device 102. This device ID is included in the virtual content request 180. This process is described in more detail later with respect to FIG. 5.

Figure 2:
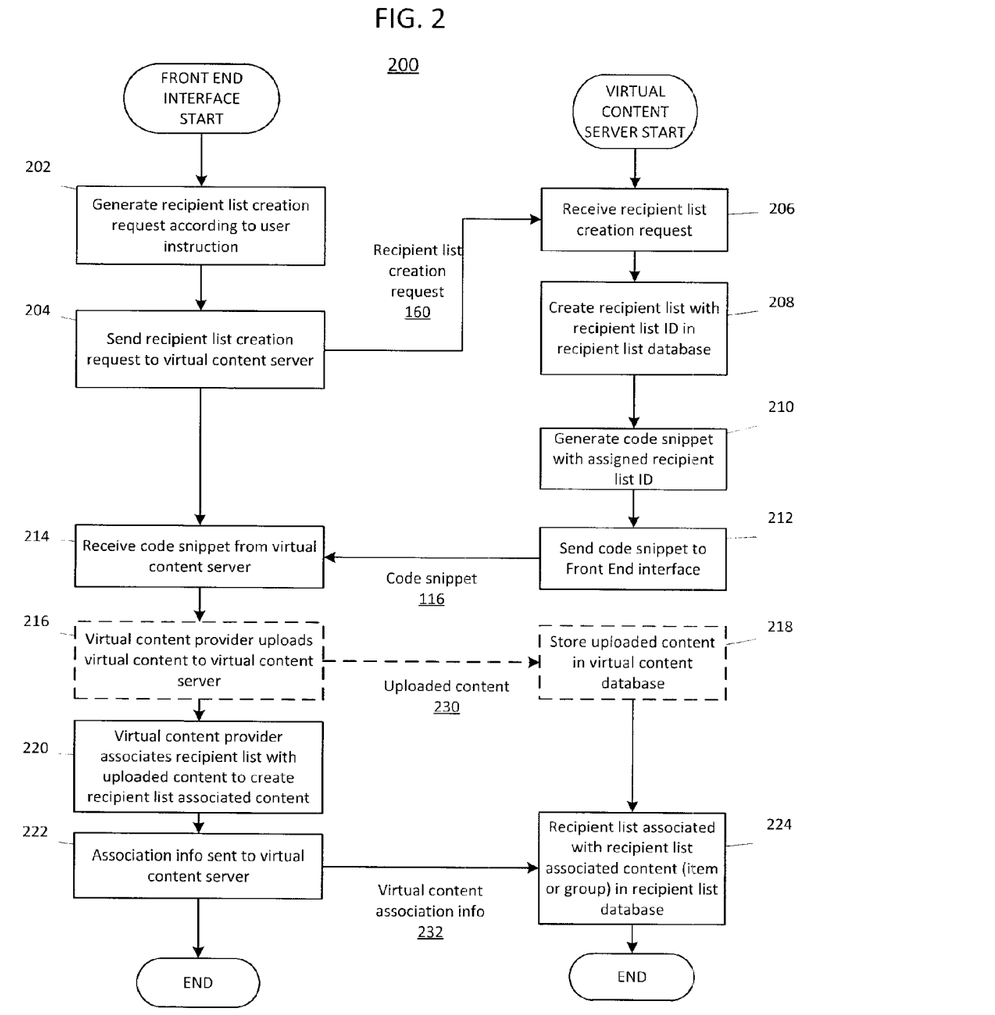
FIG. 2 illustrates a flow diagram for a process 200 of generating a boom list in boom list database 124 through operation of a front end interface 142 and generating a code snippet 116 associated with a recipient list ID of the recipient list, according to aspects of the invention.

FIG. 2 illustrates a flow diagram for a process 200 of generating a recipient list in recipient list database 124 through operation of a front end interface 142, and generating a code snippet 116 associated with a recipient list ID of the recipient list, according to aspects of the invention.

At step 202, the virtual content provider (e.g., application developer) 140 operates front end interface 142, which generates a recipient list creation request 226 in response to the operation by the virtual content provider.

It is to be understood that the virtual content provider (i.e., the advertiser) and the application developer can be the same, related, or entirely different entities. In the simplest and most common case, the virtual content provider and the app developer are the same. In the above example, the Angry Birds game developer wants to advertise about their related products/games to users who have crossed level 5 of the game. Note that the advertisements themselves are shown on either the Angry Birds game or on other mobile apps (from the same or other app developers) within the device.

In slightly more complex scenarios, the advertiser and app developer who compiles the code snippet 116 into the mobile app 104 can be different. For a real world example, consider that a TV manufacturer creates a recipient list of all users who purchased a TV by including a code snippet that executes when users reach the purchase confirmation page of the TV app. The TV manufacturer can then share/sell this recipient list of users to a DVD player manufacturer, who may be interested in showing DVD ads to these users who have already purchased a TV. The DVD ads may appear in any mobile app within the user's device that is being served by the virtual content serving system.

Figure 8A:
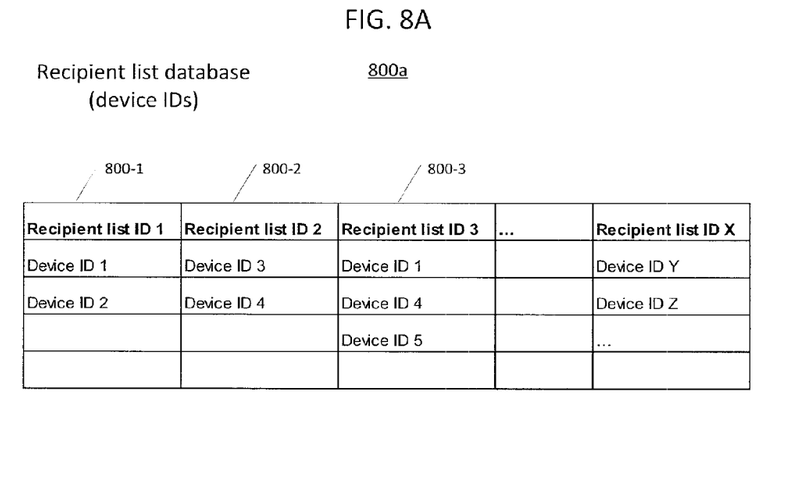

At step 204, the front end interface 142 sends the recipient list creation request 226 to virtual content server 120. At step 206, the virtual content server receives the recipient list creation request 226. At step 208, the virtual content server 120 creates and stores a recipient list (remarketing list) in recipient list database 124 in association with a recipient list ID 800. The recipient list ID 800 is stored in recipient list database 124 in association with an account ID 810 of the virtual content provider. FIG. 8A shows an example in which one or more recipient list IDs (800-1, 800-2, etc.) are stored for recipient lists in the recipient list database 800a.

In some embodiments, the developer may input recipient list information during creation of the recipient list. This recipient list information may include information such as expiration data indicating a desired expiration date for individual device IDs stored in the recipient list. For example, expiration data may indicate that any device ID stored in the recipient list older than 30 days will be deleted from the recipient list. In this manner, a recipient list may be tailored to reach only those users who have recently achieved or otherwise met the conditions for addition to the recipient list. The expiration check process can be independent of virtual content requests. For example, every day at 12 AM, an algorithm can check the age of all device IDs in a recipient list and delete those that have been stored for longer than 30 days.

Figure 8B:
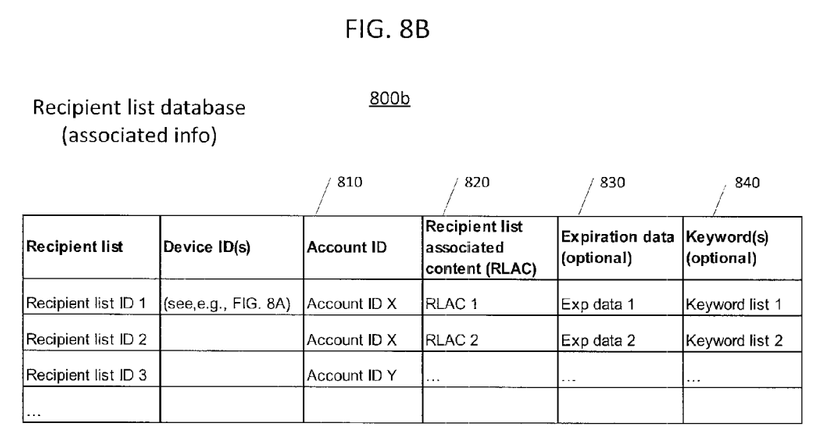
FIG. 8B shows an example in which one or more items of recipient list information are stored in association with recipient list IDs (800-1, 800-2, etc.) in recipient list database 800b.

Additionally, the recipient list information may include label data describing the recipient lists, one or more keywords to associate with the recipient list, etc. In some embodiments, this recipient list information may be sent to virtual content server 120 as part of the recipient list creation request 226. In other embodiments, the recipient list information may be sent separately to the virtual content server 120 at any time after the recipient list has been created, through operation of the front end interface 142. When the recipient list information is received at the virtual content server 120 it is stored in association with the recipient list ID 800 of the recipient list. FIG. 8B shows an example in which one or more items of recipient list information are stored in association with recipient list IDs (800-1, 800-2, etc.) in recipient list database 800b.

At step 210, the virtual content server 120 generates a code snippet 116 associated (embedded) with the recipient list ID 800 of the recipient list created in response to the recipient list creation request 226.

At step 212, the generated code snippet 116 is sent to the front end interface 142. At step 214, the code snippet 116 is received at the front end interface 142, where it is then available to the virtual content developer 140. In other embodiments, after being generated the code snippet may remain at the virtual content server 120 until requested for copying, downloading, or other retrieval by the developer operating the front end interface 142. In still further embodiments, the distribution of the code snippet 116 may be accomplished through other means such as being sent to the developer via email or snail mail.

At step 216, the virtual content provider 140 uploads virtual content 230 to virtual content server 120. At step 218, the virtual content server 120 stores the uploaded virtual content 230 in virtual content database 126.

At step 220, the front end interface 142 generates virtual content association information 232 indicative of the association of the recipient list ID with one or more uploaded or otherwise designated virtual content stored in the virtual content server, as discussed in further detail below.

At step 222, the front end interface 142 sends the association information 232 to virtual content server 120. At step 224, the virtual content server 120 associates the recipient list ID 800 with the designated one or more virtual content as recipient list associated content (RLAC) 820. FIG. 8B shows an example in which the recipient list associated content 820 is stored in association with a particular recipient list IDs (800-1, 800-2, etc.) in recipient list database 800b.

In some embodiments, steps 216 and 218 are entirely optional, since the virtual content provider 140 may have already uploaded to the virtual content database 126 the virtual content the provider desires to associate with the recipient list, at any time prior to generation of the recipient list in recipient list database 124. In other embodiments, without departing from the scope of the invention, step 216 may be carried out as part of the creation of the recipient list (for example, during steps 202 and 204), whereby the recipient list associated content 820 is uploaded to the virtual content server 120 as part of the recipient list creation request 226. In still other embodiments, the recipient list creation request 226 may include the association information 232 designating recipient list associated content previously uploaded to the virtual content server 120.

Once the process 200 illustrated in FIG. 2 has been performed, a code snippet associated with the recipient list ID has been generated and the recipient list ID has also been associated with recipient list associated content (i.e., virtual content such as an advertisement). It is this recipient list associated content which the application developer wishes to present to a user who has achieved a particular event condition in its mobile application, triggering the code snippet embedded therein. The process for downloading and retrieving and compiling the code snippet will now be described in more detail.

Figure 3:
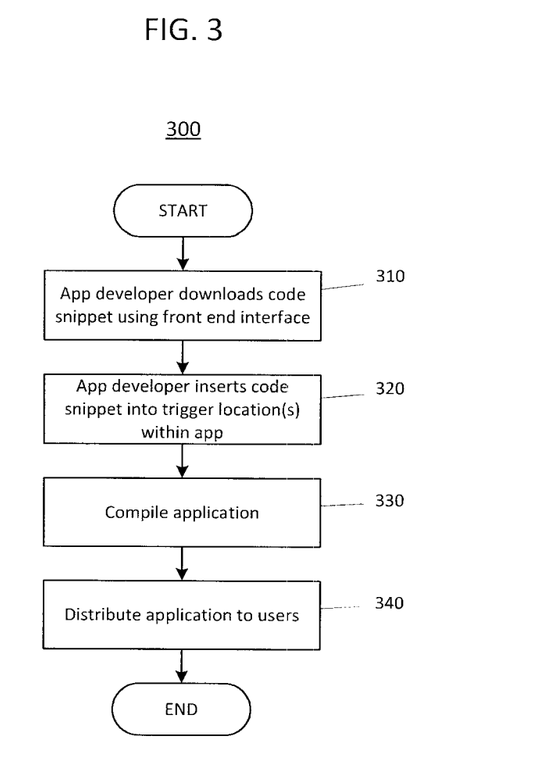
FIG. 3 illustrates a flow diagram for a process 300 of compiling a generated code snippet into the mobile app 140.

FIG. 3 illustrates a flow diagram for a process 300 of compiling a generated code snippet into the mobile app 140. At step 310, the application developer (i.e., virtual content provider or its affiliate) downloads or otherwise retrieves the code snippet 116 by operating the front end interface 142. At step 320, the application developer inserts the code snippet 116 into location(s) within the source code of mobile app 140 where the developer desires the code snippet 116 to be triggered. At step 340, the compiled application is distributed to users, such as through download, purchase from an online distributor such as Google Apps Marketplace, etc.

Figure 6:
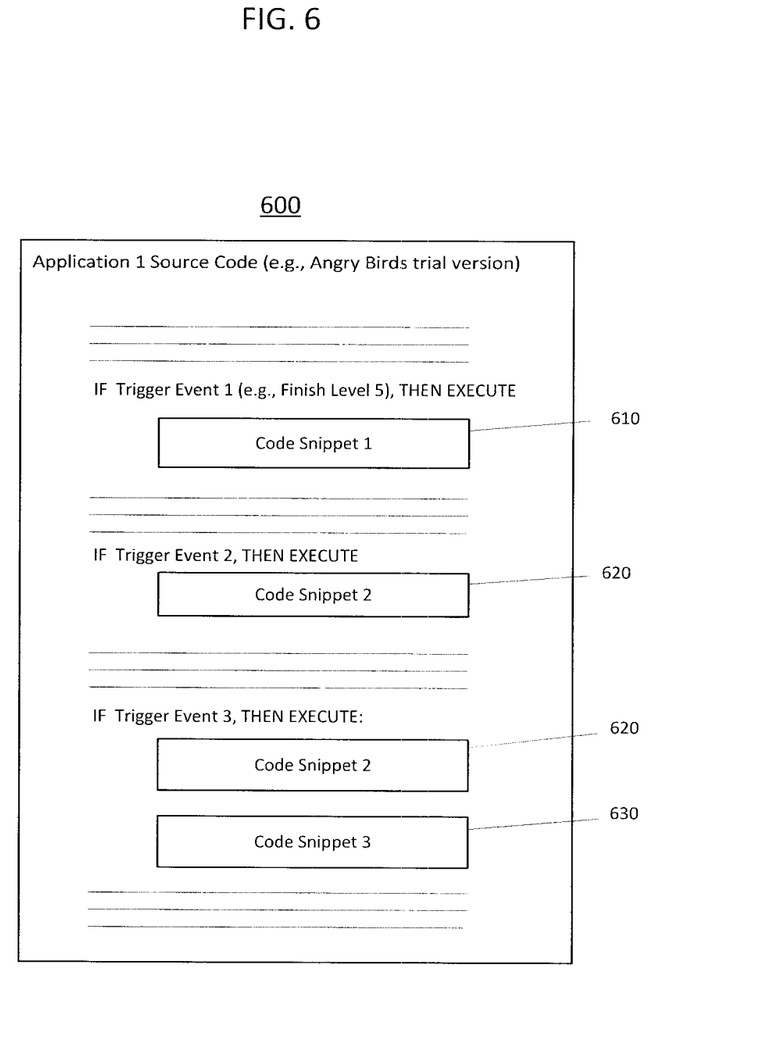
FIG. 6 shows an example of source code 600 for a mobile app in which a code snippet 610 has been inserted at an insertion point in the code such that when a particular event occurs (e.g., Event 1), the code snippet 610 is executed (triggered)

FIG. 6 shows an example of source code 600 for a mobile app in which a code snippet 610 has been inserted at an insertion point in the code such that when a particular event occurs (e.g., Event 1), the code snippet 610 is executed (i.e., triggered). In some embodiments, the same code snippet may be inserted at multiple insertion points within the same mobile application (e.g., such as code snippet 620 inserted at both Event 1 and Event 2, as shown in FIG. 6). In this case, the device ID of the device will be added to the recipient list if either Event 1 or Event 2 occurs.

In further embodiments, different code snippets may be inserted at the same point in the source code such that they are both triggered when a particular event occurs (e.g., such as code snippets 620, 630 inserted at Event 3, as shown in FIG. 6). In this case, upon the occurrence of the same event (Event 3), the device ID of the mobile device will be added to multiple recipient lists each respectively associated with the multiple triggered code snippets 620, 630.

At step 330, the mobile application source code is compiled by the application developer with any code snippets embedded therein. Once the source code is compiled, when executed the code snippets functionally result in the add recipient request engine 108, shown in FIG. 1, which may embody one or more functional aspects of the mobile device 102 and/or the mobile app 104.

In some embodiments, a generated code snippet may be associated with more than one recipient list ID. In further embodiments, more than one code snippet may be associated with the same recipient list ID.

Figure 4:
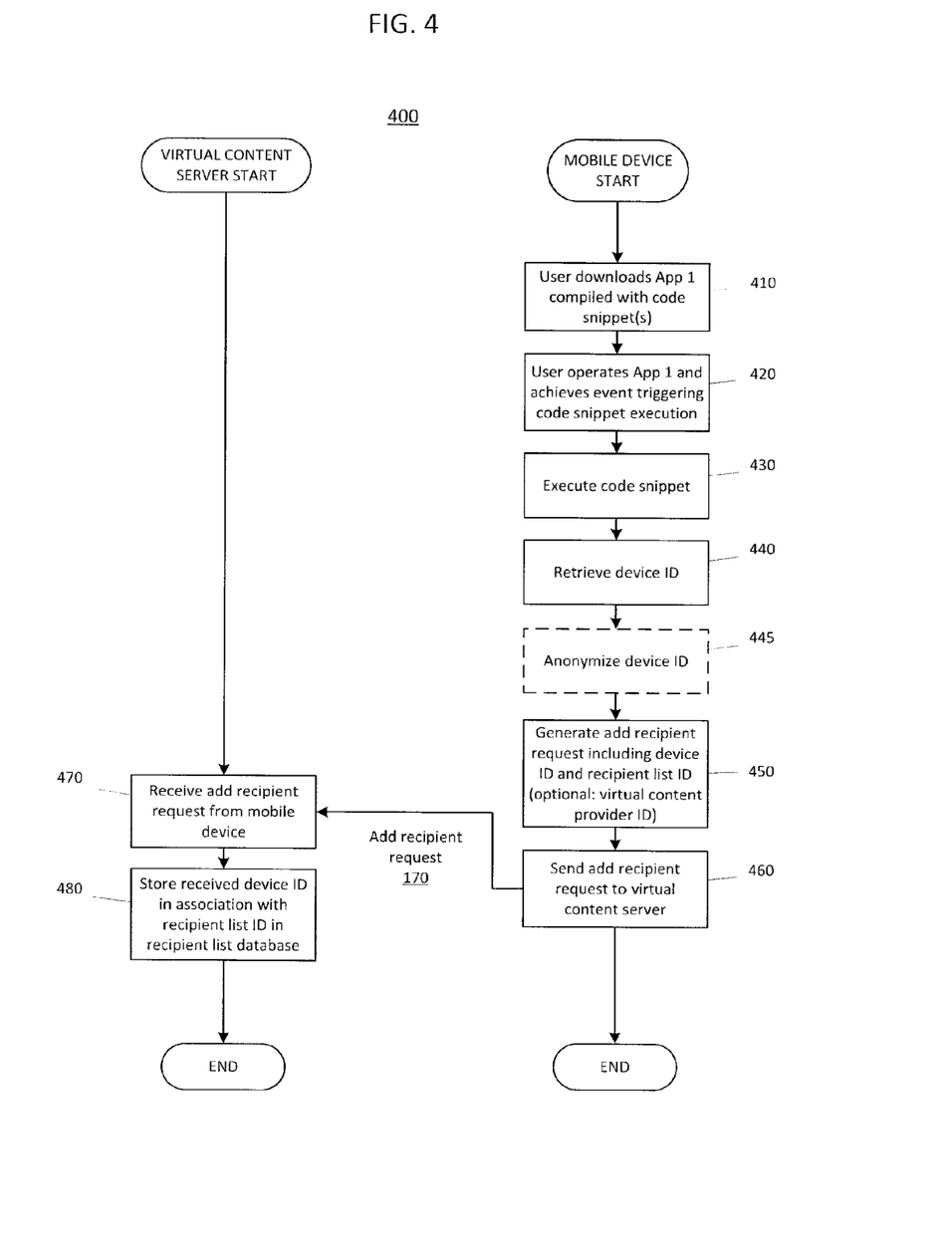
FIG. 4 illustrates a flow diagram for a process 400 of triggering execution of a code snippet such that a mobile device ID is added to the recipient list.

FIG. 4 illustrates a flow diagram for a process 400 of triggering execution of a code snippet such that a mobile device ID is added to the recipient list.

At step 410, the user of the mobile device 102 downloads or otherwise obtains and installs mobile app 140, which has been compiled with one or more code snippet(s) 116 embedded therein.

Figure 7A:
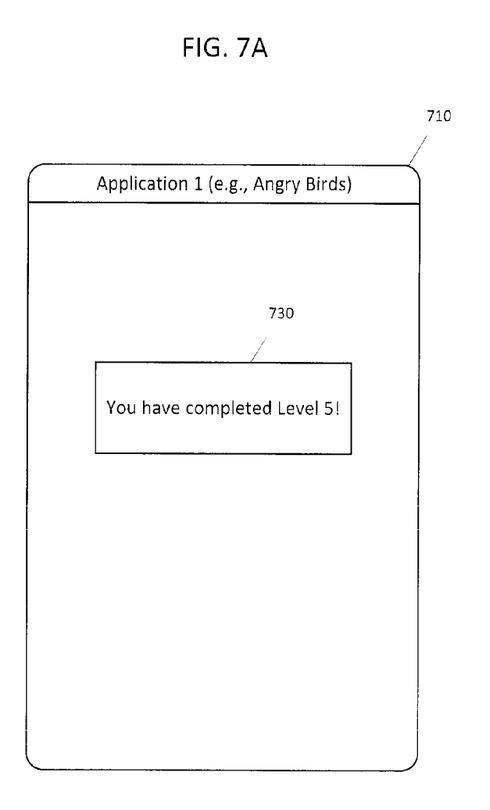
FIG. 7A shows an example of an event condition being satisfied by a user of the first mobile application (e.g., achieving Level 5 of the trial version of Angry Birds)

At step 420, the user operates mobile app 140 and achieves an event or otherwise satisfies an event condition that triggers execution of the code snippet 116 compiled in the mobile app 140. FIG. 7A shows an example of an event condition being satisfied by a user of the first mobile application (e.g., achieving Level 5 of the trial version of Angry Birds). In some embodiments, a notification 730 of the achievement of the event may be displayed to the user, although this is not essential for operation of the invention and may be specific to the application developer and/or user preferences.

At step 430, the mobile app 104 executes code snippet 116 as a result of the event condition being satisfied by the user.

At step 440, in response to execution of the code snippet 116, the device ID of the mobile device 102 is retrieved from the mobile device 102.

At step 445, the device ID of the mobile device 102 is optionally anonymized by, e.g., a hashing function.

At step 450, the add recipient request engine 108 generates a add recipient request 170 including the recipient list ID 800 associated with the executed code snippet 116 and the retrieved device ID.

At step 460, the mobile device 102 sends add recipient request 170 to the virtual content server 120, and at step 470 the virtual content server receives the add recipient request 170.

At step 480, the virtual content server 120 stores the device ID received in the add recipient request 170 in the recipient list database 124 in association with the recipient list ID also received in the add recipient request 170. In this manner, the virtual content server adds the received device ID to the recipient list in the recipient list database 124 corresponding to the recipient list ID associated with the code snippet 116 executed in mobile app 140.

In current conventional technology, mobile devices 102 already have a device ID stored therein. In some embodiments, the mobile devices 102 may provide or otherwise make accessible the device ID to the mobile application (or e.g., add recipient request engine 108) or a virtual content request engine 110 (to be described later with respect to retrieving virtual content). Alternatively, the mobile application (add recipient request engine 108 or virtual content request engine 110) may obtain, access, or otherwise read the mobile device ID. Desktop devices do not typically include such a device ID in the same way that is common to a typical mobile device, but it is also possible that desktop devices and other network-enabled devices may have or may be provided with a device ID and that such a device ID could be made available to the add recipient request engine 108 or virtual content request engine 110. For example, the add recipient request may include an HTTP request to the virtual content server to add the device ID to the boom list. The add recipient request engine 108 may create an HTTP request that sends the device ID to the virtual content server 120 for this purpose.

It is important to note that any or all of the unique identifiers (e.g. mobile device identifier, application identifier and particularly a unique identifier to uniquely identify a user) are preferably processed with an anonymizing function, such as a one-way MD5 hashing function, by the add recipient request engine 108 or virtual content request engine 110. The hashing or other equivalent (conventional) process is preferred because it protects confidential information and provides anonymity.

When the virtual content server 120 receives the hashed device ID, the virtual content server 120 is prevented from obtaining specific identity information of the device, user, and/or application and is allowed only to use the hashed device ID to uniquely identify the device, user, and/or application from other devices, users, and/or applications. Thus, by processing the obtained device ID with a hash function, individual users are protected through removal of specific identity information of a device, a user or an application program. These features are particularly important (although not strictly necessary for nominal operation) with respect to the user identification information. Companies that respect a user's privacy would be encouraged to implement these optional hashing or equivalent techniques particularly for the user identification.

Figure 5:
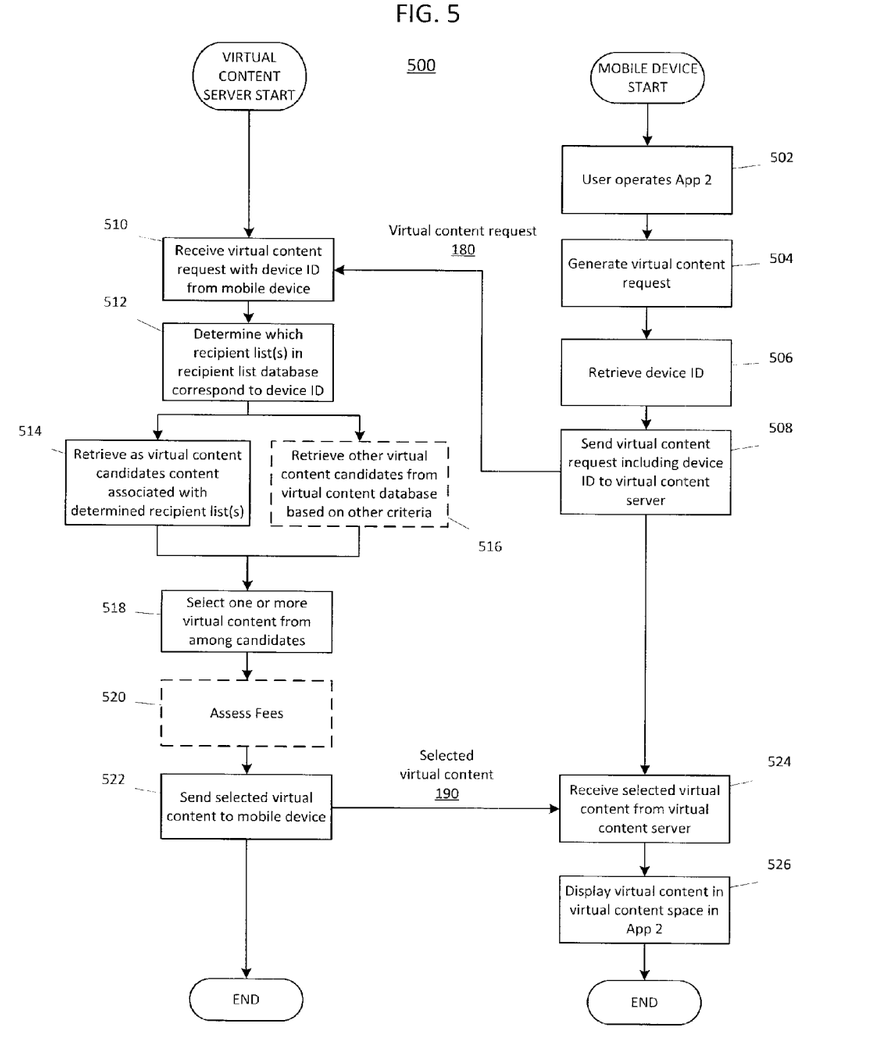
FIG. 5 illustrates a flow diagram of a process 500 of virtual content server 120 retrieving and sending virtual content 190 to mobile device 102 in response to a virtual content request 180.

FIG. 5 illustrates a flow diagram of a process 500 of virtual content server 120 retrieving and sending virtual content 190 to mobile device 102 in response to a virtual content request 180.

At step 502, a user activates or otherwise operates a second mobile application 104-2 (e.g., such as Shazam) on mobile device 102.

At step 504, during operation the second mobile app 104-2 may cause the virtual content request engine 110 to generate a virtual content request 180 for requesting virtual content from the virtual content server 120. In some embodiments, the virtual content request engine 110 may generate the virtual content request 180 in response to a particular operation by the user. In other embodiments, the virtual content request 180 may be generated as part of general operation the second mobile app 104-2 without particular user operation.

At step 506, the virtual content request engine 110 retrieves the device ID of the mobile device 102 to be included in the virtual content request 180. The device ID may be retrieved and hashed in a manner similar in respect to retrieving the device ID for the add recipient request, as previously discussed above with respect to FIG. 4.

At step 508, the virtual content request engine 110 sends the virtual content request 180, including the device ID, to the virtual content selection engine 122 of virtual content server 120.

In other embodiments, at steps 504, 506, and 508 the second mobile app 104-2 may instead generate and send the virtual content request 180. In still other embodiments, the mobile device 102 itself may generate and send the virtual content request 180 in response to operation of the second mobile app 104-2.

At step 510, the virtual content selection engine 122 receives the virtual content request 180 including the device ID from the mobile device 102.

At step 512, the virtual content selection engine 122 determines which recipient list ID(s) in the recipient list database 124 are stored in association with the device ID received in the virtual content request 180. For example, according to the execution of one or more code snippets, each associated with one or more corresponding recipient list IDs, the device ID for a particular mobile device 102 may be stored in association with any number of recipient lists in the recipient list database 124. Accordingly, in step 512 the recipient list ID(s) which are associated with the received device ID are determined.

At step 514, the virtual content selection engine 122 retrieves, as at least part of a plurality of virtual content candidates, the recipient list associated content 820 previously associated with the one or more determined recipient list IDs.

Optionally, at step 516, the virtual content selection engine 112 may also retrieve any number of other virtual content candidates from the virtual content database, based on other selection criteria, in addition to the candidates retrieved at step 514. In some embodiments, the virtual content selection engine 122 may also consider the relevance of particular virtual content according to any keywords or other criteria associated with the recipient list ID(s) in the recipient list database. In other embodiments, the virtual content selection engine 122 may also retrieve other virtual content candidates according to other selection criteria; for example, conventional ad serving systems may use contextual matching (e.g., based on current and/or past search queries, context of publishing page, history, etc.) or other algorithms to determine virtual content candidates within the content in virtual content database 126 that may be served in response to the virtual content request 180.

At step 518, the virtual content selection engine 122 selects one or more of the retrieved virtual content candidates as selected virtual content 190 to send to the mobile device in response to the virtual content request 180.

Optionally, at step 520, the virtual content server may assess fees to charge the provider(s) of the selected virtual content. This may be based on how much the provider is willing to pay for an impression (i.e., an instance of retrieval and presentation of virtual content to the user). For example, the exact content that is delivered to the device may depend on a combination of how much the advertiser has bid for a click by a user on the ad (cost per click), the relevance of the ad to the user, and the likelihood that the user will click on the ad.

At step 522, the virtual content selection engine 122 (or other aspect of virtual content server 120) sends the selected virtual content 190 to the requesting mobile device 102.

At step 524, the mobile device 102 receives the selected virtual content 190 from the virtual content server 120.

At step 526, the mobile device 102 displays or otherwise presents the received selected virtual content 190 in a virtual content space 118 or as some other presentable aspect of the second mobile app 104-2.

Figure 7B:
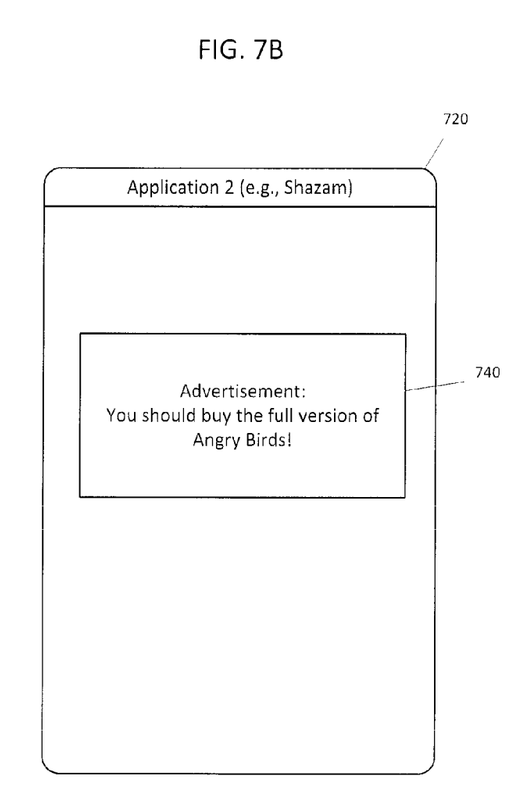
FIG. 7B shows an example where the selected virtual content 190 corresponds to recipient list associated content that was previously associated with a recipient list ID associated with an embedded code snippet.

FIG. 7B shows an example where the selected virtual content 190 corresponds to recipient list associated content that was previously associated with a recipient list ID when the user of the trial version of Angry Birds achieved Level 5 in the game, triggering execution of an embedded code snippet. In this manner, the second application 104-2 (e.g., Shazam), operated on the same mobile device 102-1 as the first application 104-1, presents virtual content retrieved according to the device ID of the mobile device 102. Accordingly, remarketed virtual content (advertisement) corresponding in some way to the achieved event condition, such as advertising the full version of Angry Birds, may be displayed on the same device on which the event condition was achieved.

In some embodiments, the process 500 shown in FIG. 5 may be implemented with a web browser 106 operable to send the virtual content request 180. The second mobile application may be a mobile application of a virtual content publisher, or a browser 106 displaying a web page of a virtual content publisher, such as a publisher of ads using Google AdSense advertisement system. By way of further example, browser 106 may be directed to a website of a virtual content publisher, where the website includes a virtual content space 118. Alternatively, browser 106 may include a virtual content space 118 as part of the browser application itself. According to aspects of the invention, virtual content space 118 displays virtual content 190 received from virtual content server 120 in response to a virtual content request 180.

The discussions of the embodiments and the modifications of the embodiments above refer to advertisers and advertising contents, but are also applicable to other virtual content providers providing other types of virtual contents.

Furthermore, the concepts of the present invention are aimed to improve a user's experience of accessing information and/or using applications on a mobile device by ensuring that potentially desirable virtual content is served to the user and/or the mobile device. However, in some cases the features created by the concepts of the present invention may not be desirable to a user. Thus, a user will be allowed to opt-in or opt-out of the features created by the concepts of the present invention.

Embodiments of the subject matter and the operations described in this specification can be implemented in digital electronic circuitry, or in computer software, firmware, or hardware, including the structures disclosed in this specification and their structural equivalents, or in combinations of one or more of their equivalents. Embodiments of the subject matter described in this specification can be implemented as one or more computer programs, i.e., one or more modules of computer program instructions, encoded on computer storage medium for execution by, or to control the operation of, a data processing apparatus. A computer storage medium can be, or be included in, a computer-readable storage device, a computer-readable storage substrate, a random or serial access memory array or device, or a combination of one or more of these. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages. The program can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output data. The processes and logic flows can also be performed by, and the apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN"), a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, although operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention being thus described, it will be obvious that the same may be varied in many ways. Such variations are not to be regarded as a departure from the spirit and scope of the invention, and all such modifications as would be obvious to one skilled in the art are intended to be included with the scope of the following claims.

What is claimed is:

1. A computer-implemented method for providing virtual content, comprising:
  generating a code snippet associated with a recipient list ID;

receiving an add recipient request to store a device ID of a device in association with the recipient list ID, said add recipient request being in response to the execution of the code snippet compiled into an application on the device;
storing the device ID in association with the recipient list ID, wherein the recipient list ID is associated with one or more virtual content as recipient list associated content;
receiving a virtual content request from the device, the virtual content request including the device ID;
determining the recipient list ID associated with the received device ID;
retrieving, as at least part of a plurality virtual content candidates, recipient list associated content associated with the determined recipient list ID; and
selecting one or more of the recipient list associated content as a candidate to send to the device in response to the virtual content request;
generating the recipient list ID of the recipient list in response to a recipient list creation request received from a front end interface;
generating the code snippet in response to the recipient list creation request; and
sending the code snippet to the front end interface.

2. The method of claim 1, wherein the code snippet is operable to cause the device to send the add recipient request when executed as compiled in a first application on the device.

3. The method of claim 1, wherein the recipient list associated content is virtual content uploaded and associated with the recipient list based on input from a front end interface.

4. The method of claim 1, further comprising:
generating the add recipient request in response to input from a first application on the device, and
receiving the virtual content request from a second application on the device.

5. The method of claim 4, wherein the first application and the second application are the same application.

6. The method of claim 4, wherein the first application and the second application are different applications.

7. The method of claim 4, wherein the first application is a free version and the virtual content associated with the recipient list ID advertises a paid version of the first application.

8. The method of claim 4, wherein the recipient list associated content advertises in-app purchases to be made within the first application or downloadable content for the first application.

9. The method of claim 1, further comprising:
determining a plurality of recipient list IDs that are each associated with the received device ID, in response to the virtual content request; and
retrieving, as at least part of the plurality of virtual content candidates, recipient list associated content associated with the plurality of determined recipient list IDs.

10. The method of claim 1, further comprising:
generating the recipient list based on recipient list information received from a front end interface, the recipient list information including one or more of a virtual content provider ID, expiration data, label data for describing the recipient list, and association data indicating virtual content to be associated with the recipient list as the recipient list associated content.

11. The method of claim 1, wherein the device is a mobile device.

12. The method of claim 1, further comprising:
sending the selected one or more virtual content candidates to the device.

13. The method of claim 1, further comprising:
selecting the selected virtual content based on one or more of factors including which of the virtual content candidates have been previously presented more often and auction bids associated with the virtual content candidates.

14. The method of claim 1, wherein the recipient list addition request further includes a virtual content provider ID identifying the virtual content provider associated with the recipient list ID.

15. The method of claim 1, where the recipient list associated content includes at least one re-marketed advertisement.

16. A computer-implemented method for providing virtual content, comprising:
generating a code snippet associated with a recipient list ID;
receiving an add recipient request to store a device ID of a device in association with the recipient list ID, said add recipient request being in response to the execution of the code snippet compiled into an application on the device;
storing the device ID in association with the recipient list ID, wherein the recipient list ID is associated with one or more virtual content as recipient list associated content;
receiving a virtual content request from the device, the virtual content request including the device ID;
determining the recipient list ID associated with the received device ID;
retrieving, as at least part of a plurality virtual content candidates, recipient list associated content associated with the determined recipient list ID;
selecting one or more of the recipient list associated content as a candidate to send to the device in response to the virtual content request; and
deleting device IDs from a recipient list based on whether a particular device ID has been stored in the recipient list longer than a threshold indicated by expiration data associated with the recipient list.

17. A computer-implemented method for providing virtual content, comprising:
generating a code snippet associated with a recipient list ID;
receiving an add recipient request to store a device ID of a device in association with the recipient list ID, said add recipient request being in response to the execution of the code snippet compiled into an application on the device;
storing the device ID in association with the recipient list ID, wherein the recipient list ID is associated with one or more virtual content as recipient list associated content;
receiving a virtual content request from the device, the virtual content request including the device ID;
determining the recipient list ID associated with the received device ID;
retrieving, as at least part of a plurality virtual content candidates, recipient list associated content associated with the determined recipient list; and
selecting one or more of the recipient list associated content as a candidate to send to the device in response to the virtual content request; and
anonymizing the device ID of the device, wherein the device ID uniquely identifies the device.

18. A virtual content serving system, comprising:
first generating means for generating a code snippet associated with a recipient list ID;
receiving means for receiving an add recipient request including a device ID of a device and the recipient list ID, the add recipient request being in response to the execution of the code snippet as compiled into an application on the device;

a storage unit storing the device ID in association with the recipient list ID, wherein the recipient list ID is associated with one or more virtual content as recipient list associated content;

receiving means for receiving a virtual content request from the device, the virtual content request including the device ID;

determining means for determining the recipient list ID associated with the received device ID;

retrieving means for retrieving, as at least part of a plurality virtual content candidates, recipient list associated content associated with the determined recipient list ID; and selecting means for selecting the recipient list associated content as a candidate to send to the device in response to the virtual content request second generating means for generating the recipient list ID of the recipient list in response to a recipient list creation request received from a front end interface; and sending means for sending the code snippet to the front end interface;

the first generating means generating the code snippet in response to the recipient list creation request.

19. The virtual content serving system of claim 18, wherein when executed as part of a first mobile application on the device, the code snippet is operable to cause the device to send the add recipient request to the virtual content serving system.

20. The virtual content serving system of claim 18, further comprising:

an input unit receiving an instruction to generate the recipient list in response to a recipient list creation request received from a front end interface.

21. The virtual content serving system of claim 18, further comprising:

an output unit outputting the selected recipient list associated content to the device.

* * * * *